Figure 1:
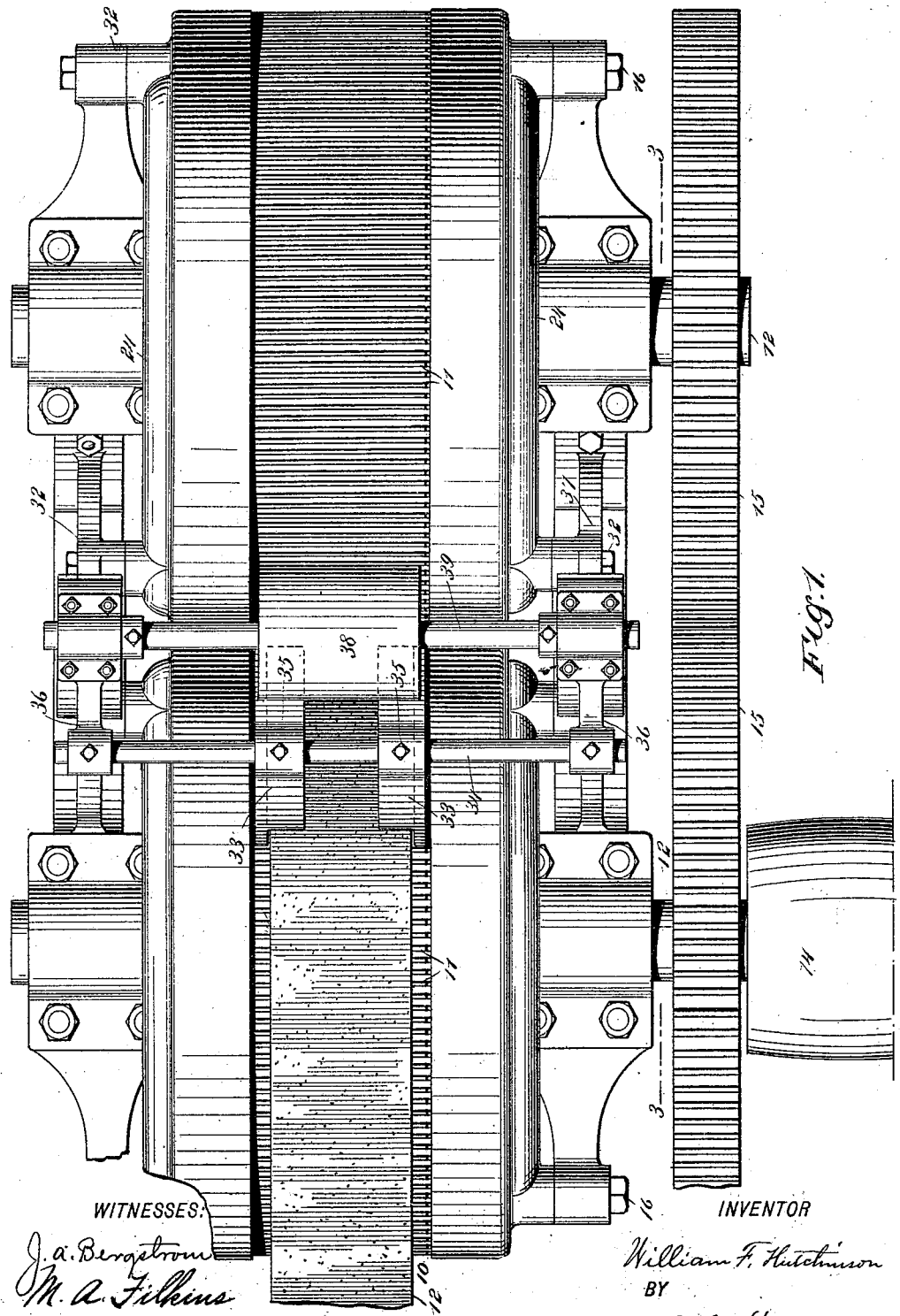

(No Model.) 7 Sheets—Sheet 1.
W. F. HUTCHINSON.
MATCH SPLINT MACHINE.

No. 544,537. Patented Aug. 13, 1895.

WITNESSES:
J. A. Bergstrom
M. A. Filkins

INVENTOR
William F. Hutchinson
BY
W. B. Hutchinson
ATTORNEY.

(No Model.) 7 Sheets—Sheet 2.

W. F. HUTCHINSON.
MATCH SPLINT MACHINE.

No. 544,537. Patented Aug. 13, 1895.

WITNESSES:
J. A. Bergstrom
M. A. Filkins

INVENTOR
BY William F. Hutchinson
W. B. Hutchinson
ATTORNEY.

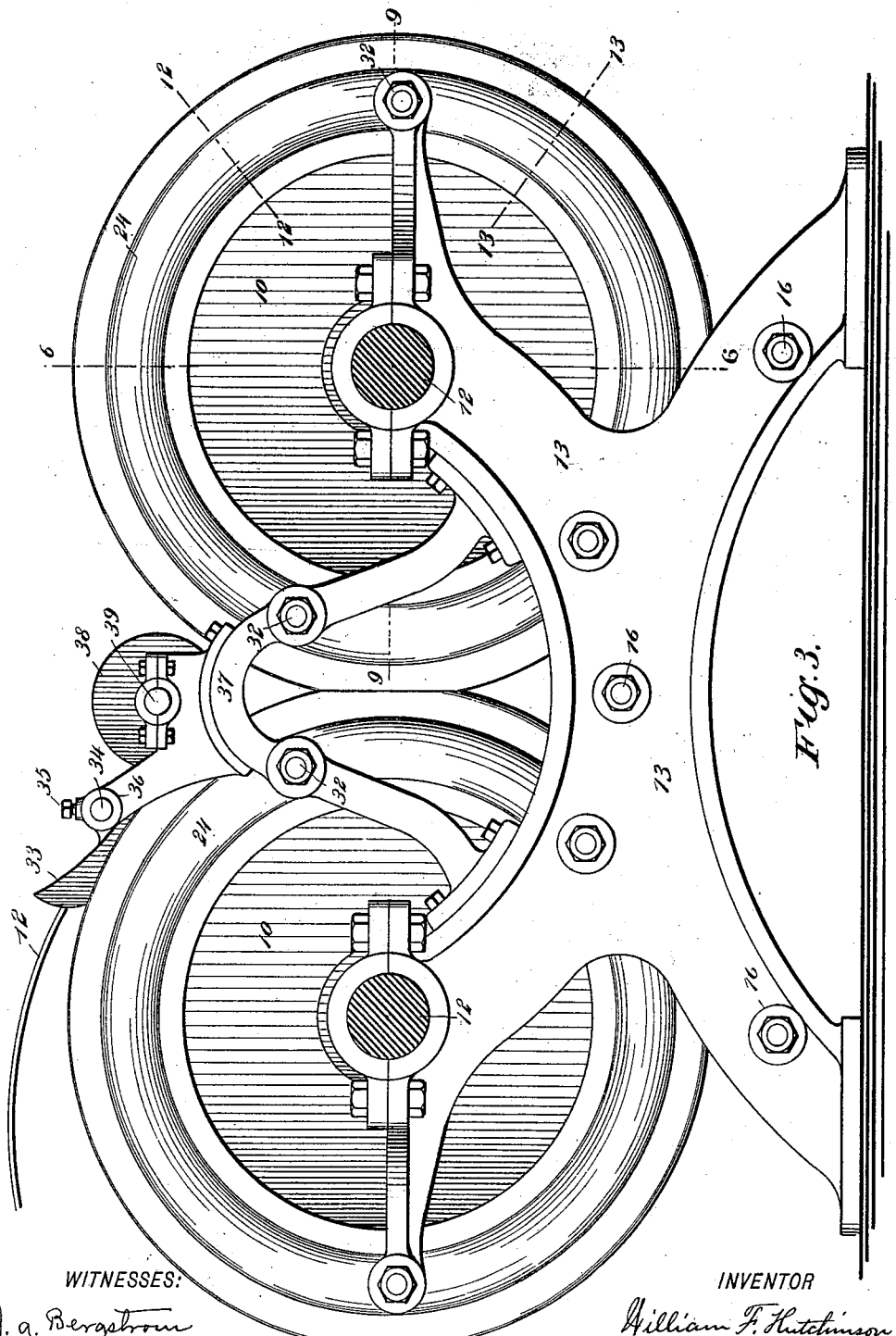

(No Model.) 7 Sheets—Sheet 4.

W. F. HUTCHINSON.
MATCH SPLINT MACHINE.

No. 544,537. Patented Aug. 13, 1895.

WITNESSES:
J. A. Bergstrom
M. A. Filkins

INVENTOR
William F. Hutchinson
BY
H. B. Hutchinson
ATTORNEY.

(No Model.) 7 Sheets—Sheet 5.
W. F. HUTCHINSON.
MATCH SPLINT MACHINE.

No. 544,537. Patented Aug. 13, 1895.

WITNESSES:
J. A. Bergstrom
M. A. Filkins

INVENTOR
William F. Hutchinson
BY
W. P. Hutchinson
ATTORNEY.

(No Model.) 7 Sheets—Sheet 6.

W. F. HUTCHINSON.
MATCH SPLINT MACHINE.

No. 544,537. Patented Aug. 13, 1895.

WITNESSES:
J. A. Bergstrom
M. A. Filkins

INVENTOR
William F. Hutchinson
BY
W. P. Hutchinson
ATTORNEY.

(No Model.) 7 Sheets—Sheet 7.

W. F. HUTCHINSON
MATCH SPLINT MACHINE.

No. 544,537. Patented Aug. 13, 1895.

WITNESSES:
J. A. Bergstrom
M. A. Filkins

INVENTOR
William F. Hutchinson
BY
W. B. Hutchinson
ATTORNEY.

UNITED STATES PATENT OFFICE.

WILLIAM F. HUTCHINSON, OF PASSAIC, NEW JERSEY, ASSIGNOR TO THE CONTINENTAL MATCH COMPANY, OF NEW JERSEY.

MATCH-SPLINT MACHINE.

SPECIFICATION forming part of Letters Patent No. 544,537, dated August 13, 1895.

Application filed February 13, 1895. Serial No. 538,304. (No model.)

*To all whom it may concern:*

Be it known that I, WILLIAM F. HUTCHINSON, of Passaic, in the county of Passaic and State of New Jersey, have invented certain new and useful Improvements in Match-Splint Machines, of which the following is a full, clear, and exact description.

My invention relates to an improvement in a machine for cutting match-splints from strips or veneers of wood, which are usually cut so that the width of the strip corresponds to the length of the match-splint, and which are split up into splints by my improved machine.

The object of my invention is to produce a machine which has practically two cutting-drums, the teeth of which serve as knives and mesh together; to provide a simple and positive means of ejecting the splints from between the teeth of the drums at any desired point; to construct this ejecting mechanism in such a way that it shall work positively and without danger of getting out of repair; to arrange the feed of the machine in such a way that the veneer shall be fed evenly between the drums, and in, general, to produce a machine which is adapted to cutting splints very nicely and rapidly and which may also be used for cutting metal or strips of other material into a series of articles.

To these ends my invention consists of a splint-cutting machine comprising oppositely-arranged cutting-drums having meshing-teeth with ejectors arranged between the teeth of both drums; also, in certain features of construction and combinations of parts, which will be hereinafter described and claimed.

Reference is to be had to the accompanying drawings, forming a part of this specification, in which similar figures refer to corresponding parts throughout the several views.

Figure 2:
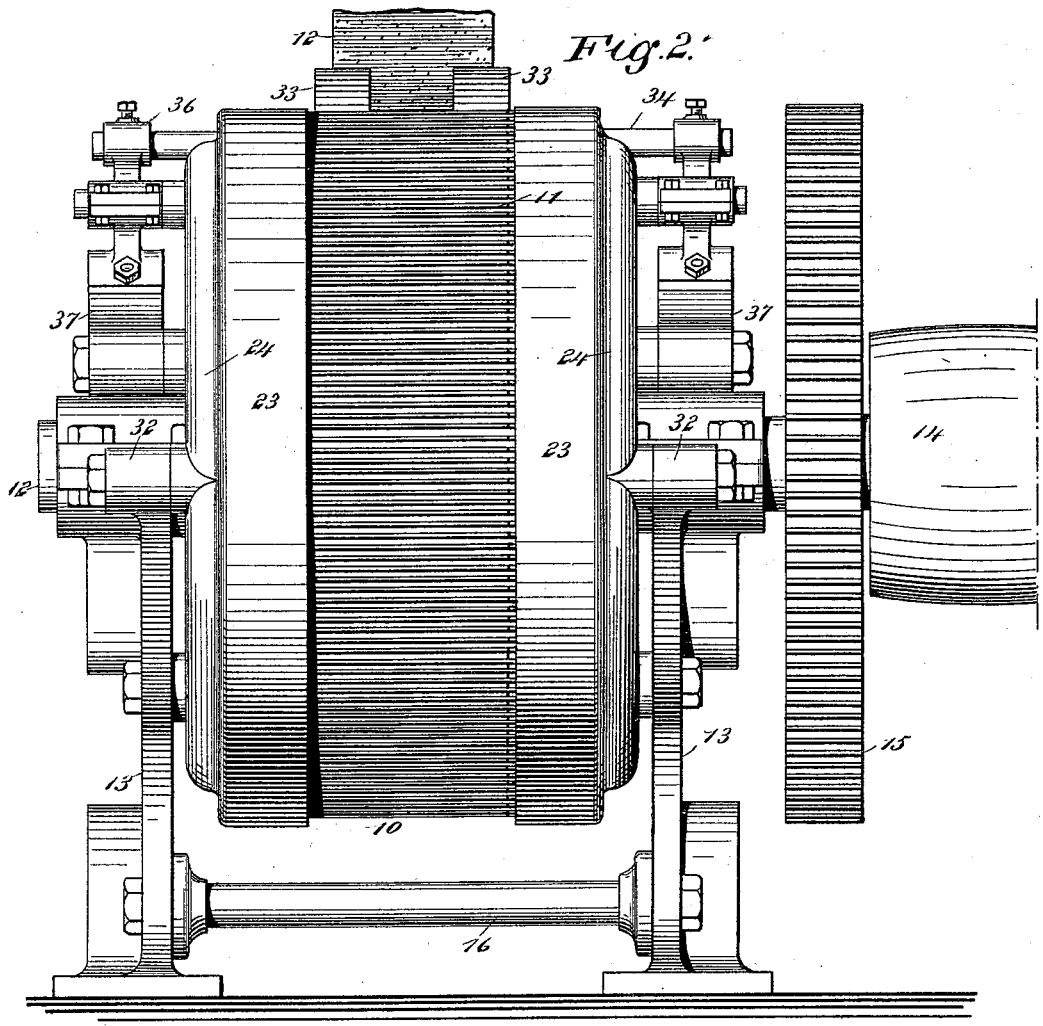
Figure 5:
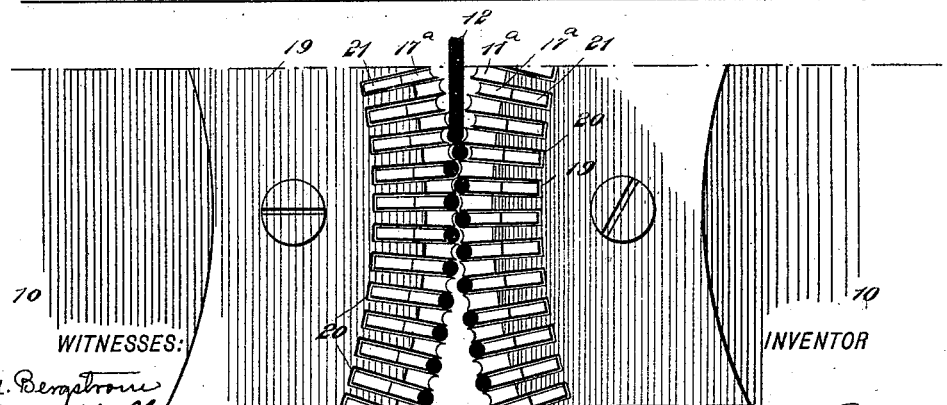
Figure 4:
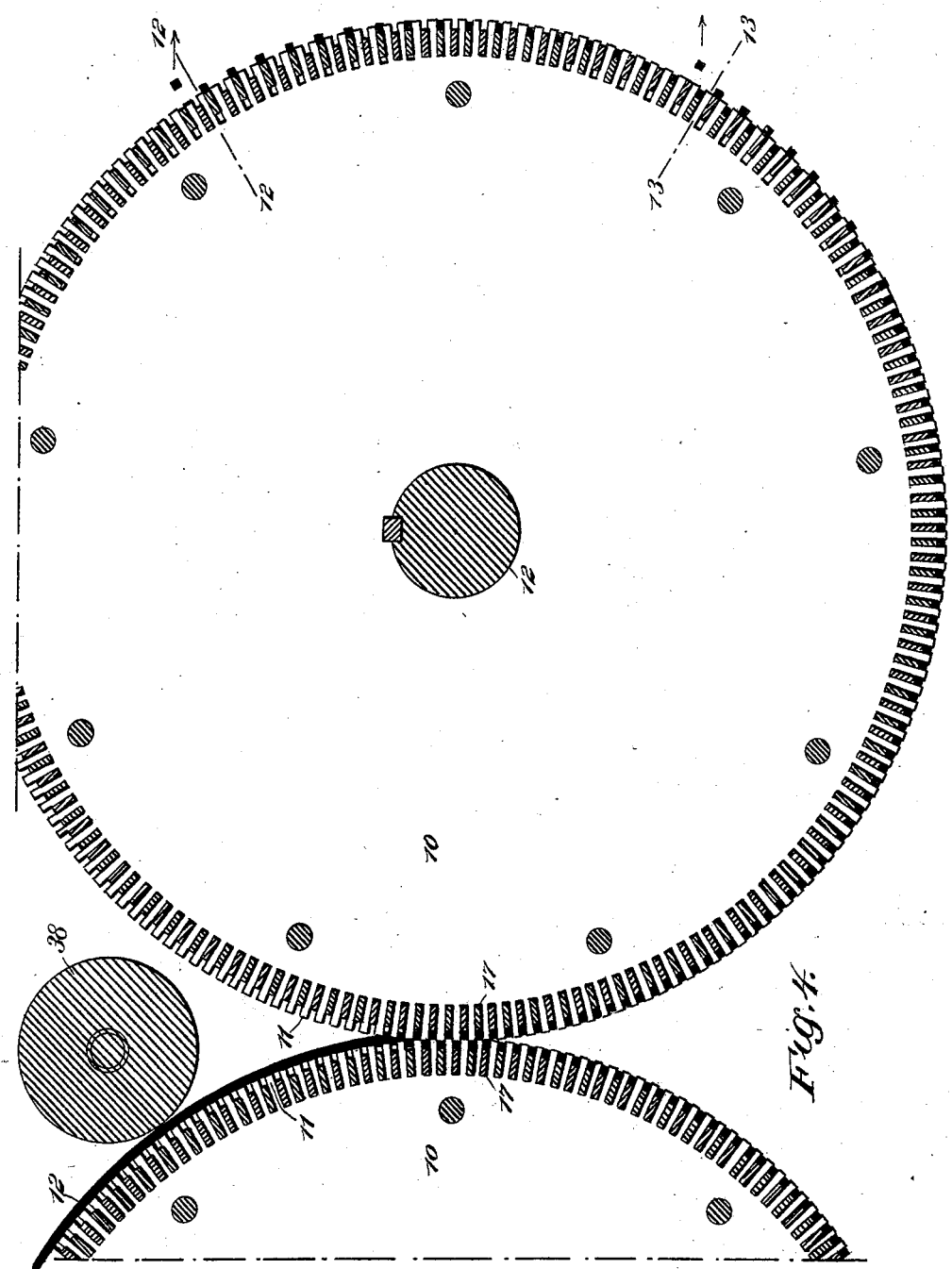
Figure 6:
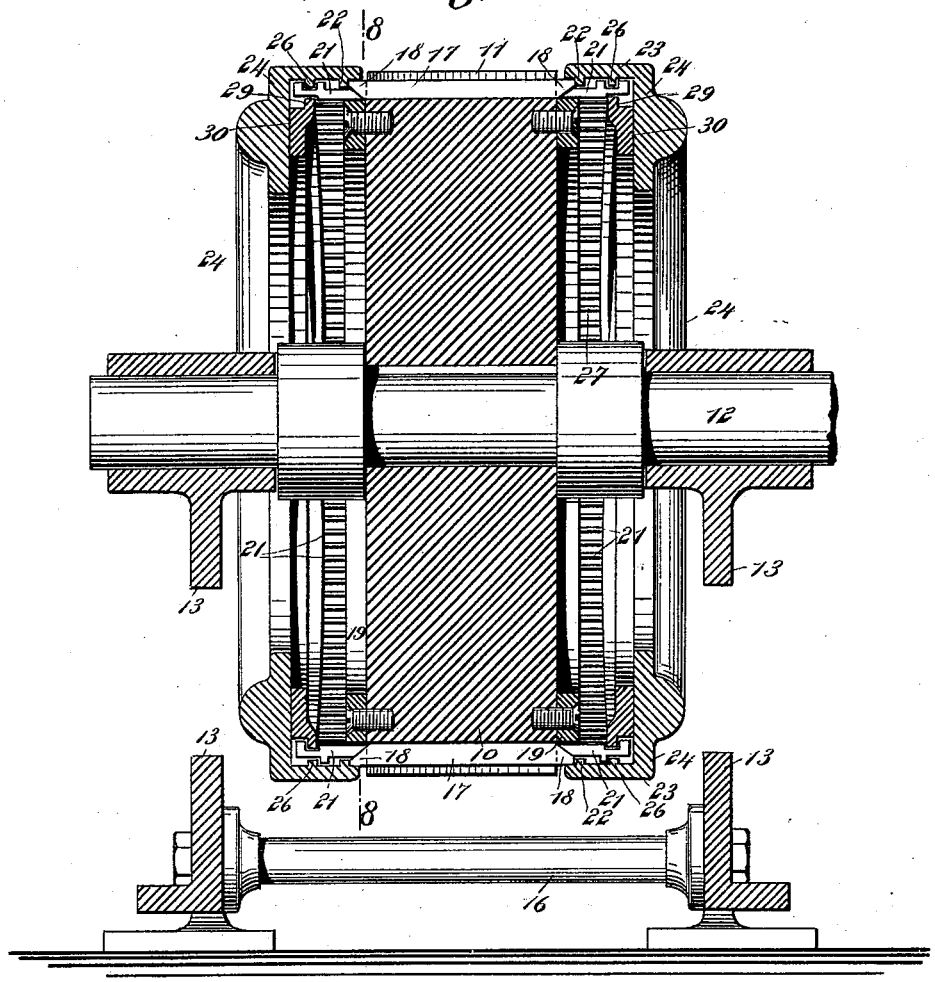
Figure 7:
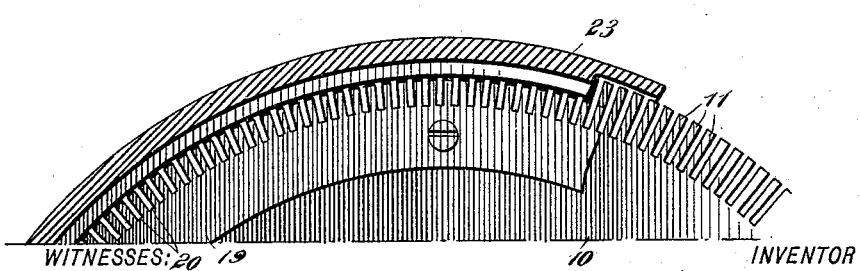
Figure 8:
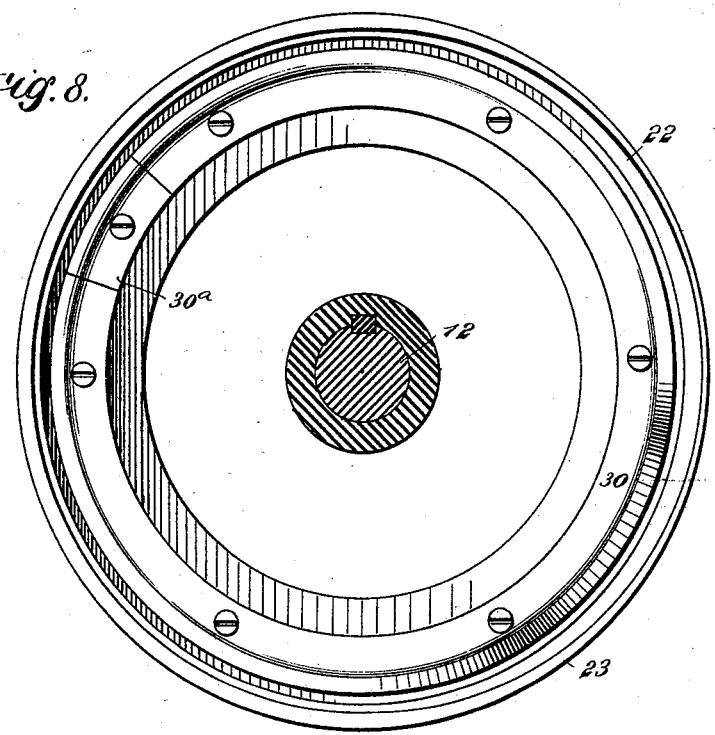
Figure 9:
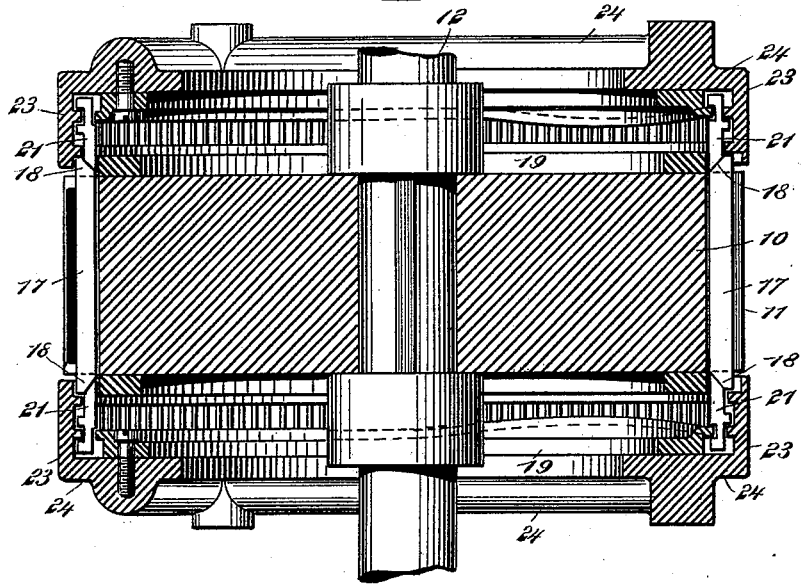
Figure 10:
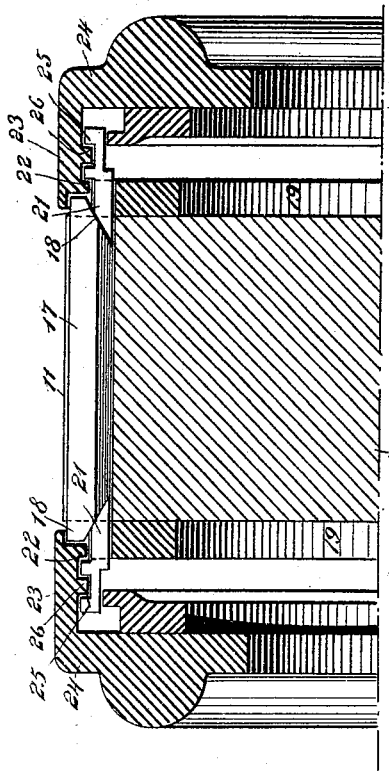
Figure 11:
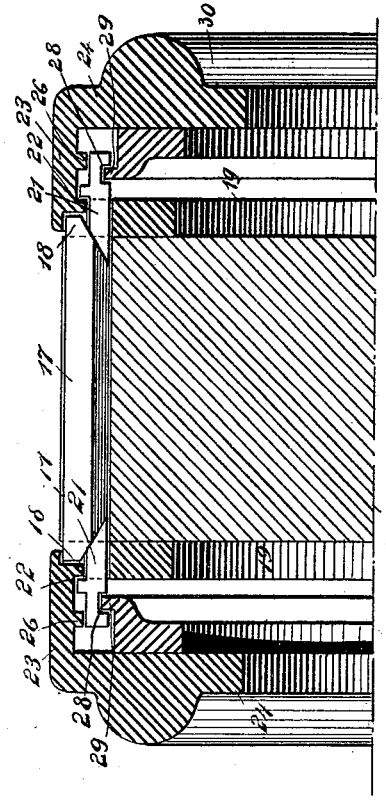
Figure 12:
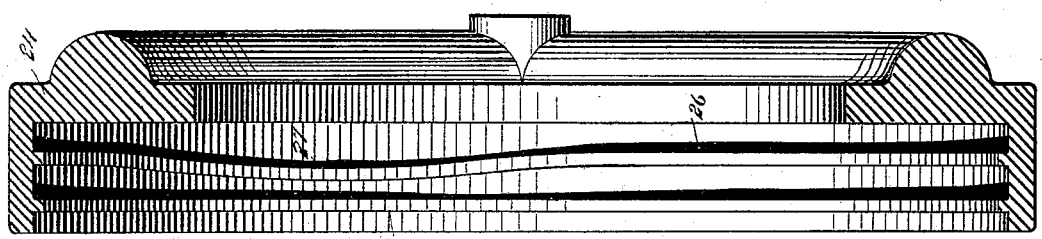
Figure 13:
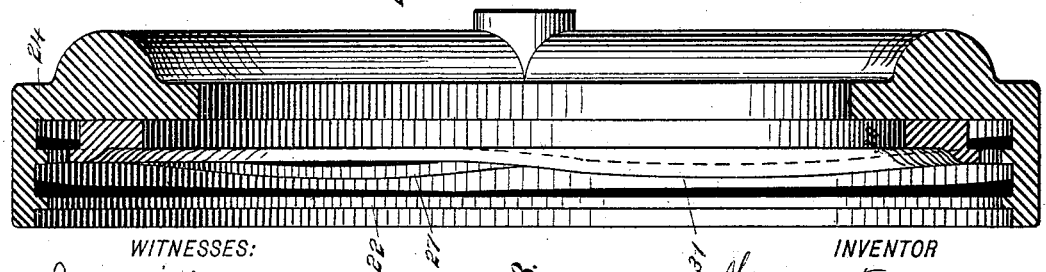

Figure 1 is a broken plan view of the machine embodying my invention. Fig. 2 is an end view of the machine. Fig. 3 is a sectional elevation on the line 3 3 of Fig. 1. Fig. 4 is an enlarged detail sectional view of the two cutting-drums, showing a strip of veneer being fed between the drums. Fig. 5 is a broken detail end view of the cutting-drums, with their teeth and ejectors slightly modified, so as to cut round splints or analogous articles. Fig. 6 is a cross-section on the line 6 6 of Fig. 3. Fig. 7 is an enlarged detail sectional view of the end portion of one of the cutting-drums and the flange which overhangs the said end portion of the machine. Fig. 8 is a cross-section on the line 8 8 of Fig. 6 and shows the inside of one of the end rings of the machine and the cam-rings carried by the said end ring. Fig. 9 is a sectional plan on the line 9 9 of Figs. 3 and 8. Fig. 10 is a detail cross-section through a portion of one of the cutting-drums, showing one set of ejecting-wedges in position to move an ejector. Fig. 11 is a view similar to Fig. 10, but showing the second set of ejecting-wedges in position for use. Fig. 12 is a detail section of one of the end rings of the machine, the section being taken on the line 12 12 of Figs. 3 and 4. Fig. 13 is also a cross-section of one of the end rings, the section being taken on the line 13 13 of Figs. 3 and 4.

The machine is provided with two cutting-drums 10, which are exactly similar in construction and are preferably similar in size, these drums having peripheral teeth 11, which mesh, as illustrated clearly in Fig. 4, and as they come together cut through the strip of veneer 12, which is fed to the drums, and the severed splints which are cut or split from the veneer are left between the teeth of the drums until ejected by mechanism which will be presently described. The drums 10 are carried by shafts $12^a$, which are journaled in the frame 13 of the machine, which frame may be of any suitable construction, and one of the shafts is provided with a driving-pulley 14, or equivalent means of driving it, while the two shafts are connected by gears 15, so that both shafts and drums turn in unison. The frame is braced by suitable cross-rods 16.

When the veneer 12 is cut by the teeth 11 of the drums, as specified above, the severed splints are forced inward between the teeth and upon ejectors 17, which extend longitudinally between the teeth, and which, when forced outward to the edges of the teeth, push out the splints. The ejectors 17 are beveled or inclined at the ends and on the back sides, as shown at 18 in Figs. 10 and 11, to enable them to be easily acted on by the wedges 21, described below, and these inclined ends project into the slots 20 of the guide-rings 19, which are secured to the ends of the drums 10, and the slots of which register with the spaces between the teeth 11 of the drums. The ejectors 17 are forced out by means of longitudinally-sliding wedges 21, which move in the slots 20 of the guide-rings 19, and which have inclined inner ends to abut with the inclined ends 18 of the ejectors 17. The wedges 21 are held against radial movement by the rings 22, which are formed on the inner side of the flanges 23 of the end rings 24, which are bolted to the machine-frames at the ends of the drums, so that a pair of such end rings embrace the ends of one of the drums 10. The ejectors are arranged in alternate series—that is, so that one set of ejecting-wedges 21, which is arranged between a certain pair of teeth of the cutting-drum, will move outward at one point, while the wedges between the next pair of teeth will move out at another point, thus causing the splints held between the teeth of the drum to be ejected at two different points, and it will be understood from the description to follow that this arrangement may be carried out to any desired extent, so that the deposition of the splints may be effected at as many points as may be necessary or desirable.

To provide for the above operation one series of ejecting-wedges 21 have grooves 25 in their outer sides, which follow the cam-rings 26 on the inner sides of the flanges 23, and these cam-rings swell inward at a certain point, which, as illustrated, is at the point 27 on the section 12 12 of Fig. 4, so that when the drum 10 is revolved and the wedges following the cam-ring reach the cam or swell 27 they are forced inward, thus pushing out the ejectors 17 and throwing out the splints, as illustrated in Fig. 4, the ejectors being prevented from moving outward too far by the overlapping flanges 23. The other series of ejecting-wedges 21 are grooved on their inner sides, as shown at 28 in Fig. 11, and these grooves receive the cam-ring 29, which is arranged concentric with the cam-ring 26, but is provided with a base-flange 30, which is secured to the end ring 24. The cam-rings 29 swell inward, as shown at 31 in Fig. 13, this point being on the section 13 13 of Figs. 3 and 4, so that when the ejecting-wedges reach this part of the cam-rings 29 the wedges are moved inward, the ejectors 17 opposite them are moved outward, and the splints are forced from between the teeth, as shown clearly in Fig. 4. It thus follows that half the splints of one of the drums 10 will be ejected at one place and the remaining half at another, and, as only half the splints which are cut are discharged by one drum, the ejecting of splints takes place at four different points on the machine, and as the machine cuts very rapidly this enables the splints to be conveniently taken care of and conveyed away by any suitable system of carriers. It will, of course, be understood that the principle of the machine would be the same if the ejectors were all actuated at a certain point; but it is desirable to have the multiple arrangement of ejectors, as otherwise the machine cannot be run as rapidly as is to be desired, for the reason that no means can be provided for taking care of the splints.

The end rings 24, referred to above, are bolted securely to the frame 13, as shown at 32 in Figs. 1 and 2, but any suitable means may be employed for holding the rings in stationary position.

The veneer 12 is guided between the drums 10 by means of the angular guides 33, (see Fig. 1,) which are held on the cross-rod 34 and are adjustable back and forth in relation to each other, so as to adapt them to varying widths of veneer, the guides being held in any desired position by set-screws 35, which project through a portion of the guides and impinge on the rod 34. The rod 34 is held in brackets 36, which are fastened to supports 37 on the main frame 13. After leaving the guides 33 the veneer is pressed into close contact with one of the drums 10 by the roller 38, which is mounted on the shaft 39, this being journaled on the brackets 36, and the veneer is thus held, so that there is no chance for it to kink as it enters the machine. As the veneer enters between the drums it is rapidly cut into splints by the teeth 11 and half the splints are held between the teeth of one drum, while the other half are held between the teeth of the opposite drum, and the splints stick between the teeth until they reach the points where the ejectors are actuated by the cam-rings 26 and 29, as already described, at which points they are thrown out upon suitable carriers which are arranged to receive them.

The arrangement described is adapted for cutting splints which are rectangular in cross-section; but if it is desired to cut splints or other articles which are circular in cross-section the faces of the teeth are concaved, as shown at $11^a$ in Fig. 5, while the ejectors $17^a$, which are placed opposite the teeth—that is, the ejectors of one drum are opposite the teeth of the other drum—are similarly concaved.

I have shown and described a machine which is especially intended for cutting match-splints; but it will be understood at once that the machine may be adapted for cutting other articles, either from veneer or other material, the only necessary modification being to properly space the teeth, as otherwise the machine is adapted to cut anything which is essentially straight and which can be cut by the action of the oppositely-arranged teeth 11.

I have shown and described ejecting-wedges 21 at both ends of the ejectors 17 and shall refer to this duplicate arrangement in the claims; but it will, of course, be understood that one set of wedges may be used singly—that is, a set at one end of the ejectors—without affecting the principle of the invention.

Having thus fully described my invention, what I claim, and desire to secure by Letters Patent, is—

1. In a machine of the kind described the combination with the cutting drum, of the ejectors arranged between the cutting portions of the drum, the wedges behind the ejectors to move the latter radially, each ejector having its individual wedge arrangement and devices opposite the drum ends to actuate the wedges, substantially as described.

2. A machine of the kind described, comprising oppositely arranged cutting drums having meshing teeth, and ejectors arranged between the teeth to force outward the materials cut thereby, substantially as described.

3. The combination with a cutting drum having peripheral teeth which serve as knives of the ejectors, held between the teeth of the drum, and reciprocating wedges arranged to move behind the ejectors, substantially as described.

4. The combination with the revoluble cutting drum having peripheral teeth which serve as knives, of the ejectors between the teeth, the reciprocating wedges movable behind the ejectors, and the stationary cam rings at the ends of the drums and in engagement with the wedges, substantially as described.

5. The combination with the cutting drum having peripheral teeth which serve as knives, of the ejectors between the teeth, the wedges reciprocating behind the ejectors, and a double set of cam rings arranged to engage alternate wedges and move them inward at different points during the rotation of the cutting drum, substantially as described.

6. The combination with the cutting drum having peripheral teeth which serve as knives, of the ejectors held between the teeth and provided with inclined ends, the wedges inclined to fit against the inclined ends of the ejectors, and the stationary cams for actuating the wedges, substantially as described.

7. The combination with the revoluble cutting drum having peripheral teeth which serve as knives, of the ejectors arranged between the teeth, the reciprocating wedges behind the ejectors, the stationary end rings having flanges overlapping the ends of the ejectors, and the cam rings carried by the stationary rings and arranged to engage and actuate the wedges, substantially as described.

8. The combination with revoluble cutting drums having peripheral teeth which serve as knives, and the ejectors arranged between the teeth, of the reciprocating wedges behind the ejectors, the alternating wedges being provided respectively with grooves on their outer and inner sides, and a double set of cam rings held stationary at the ends of the drum and adapted to engage the grooves of the wedges, substantially as described.

WILLIAM F. HUTCHINSON.

Witnesses:
WALLACE A. DOWNS,
WARREN B. HUTCHINSON.